United States Patent [19]

Jefferson

[11] 4,260,085
[45] Apr. 7, 1981

[54] MOTORCYCLE ICE CHEST

[76] Inventor: John A. Jefferson, 5807 14th St., NW., Apt. 100, Washington, D.C. 20011

[21] Appl. No.: 130,379

[22] Filed: Mar. 14, 1980

Related U.S. Application Data

[62] Division of Ser. No. 822,240, Aug. 5, 1977, Pat. No. 4,195,757.

[51] Int. Cl.³ .............................................. B62J 7/04
[52] U.S. Cl. ............................ 224/32 R; 280/289 A; 206/541; 220/20; 224/31
[58] Field of Search ................... 224/273, 30 R, 32 A; 220/20, 22, 23.83; 280/289 A, 769

[56] References Cited
U.S. PATENT DOCUMENTS

| | | | |
|---|---|---|---|
| 2,584,435 | 2/1952 | Doerr | 220/20 X |
| 3,687,344 | 8/1972 | Nixon | 224/273 |
| 3,850,353 | 11/1974 | Foulds | 224/30 R X |
| 3,909,092 | 9/1975 | Kiernan | 220/20 X |
| 4,162,029 | 7/1979 | Gottsegen | 220/23.83 X |
| 4,163,513 | 8/1979 | Kramer | 280/289 A X |
| 4,182,521 | 1/1980 | Durand et al. | 280/289 A X |

Primary Examiner—Steven M. Pollard
Attorney, Agent, or Firm—Saidman & Sterne

[57] ABSTRACT

An ice chest included in a container which is suitable for mounting upon a rear rack or carrier on a motorcycle. The container includes a second, separate compartment for containing dry goods which is positioned adjacent the ice compartment for maintaining such goods in a cooled condition. The ice compartment houses a removable tray which supports beverage containers adapted to be kept cold within the chest. The ice compartment and dry compartment include separate covers and locking or closure means. A fresh water compartment is also provided within the ice compartment and has an externally accessible faucet extending through the side wall of the chest. Drainage for the water resulting from melting ice is also provided for, and the rear of the chest has a padded back rest mounted thereon for the rider of the motorcycle.

10 Claims, 5 Drawing Figures

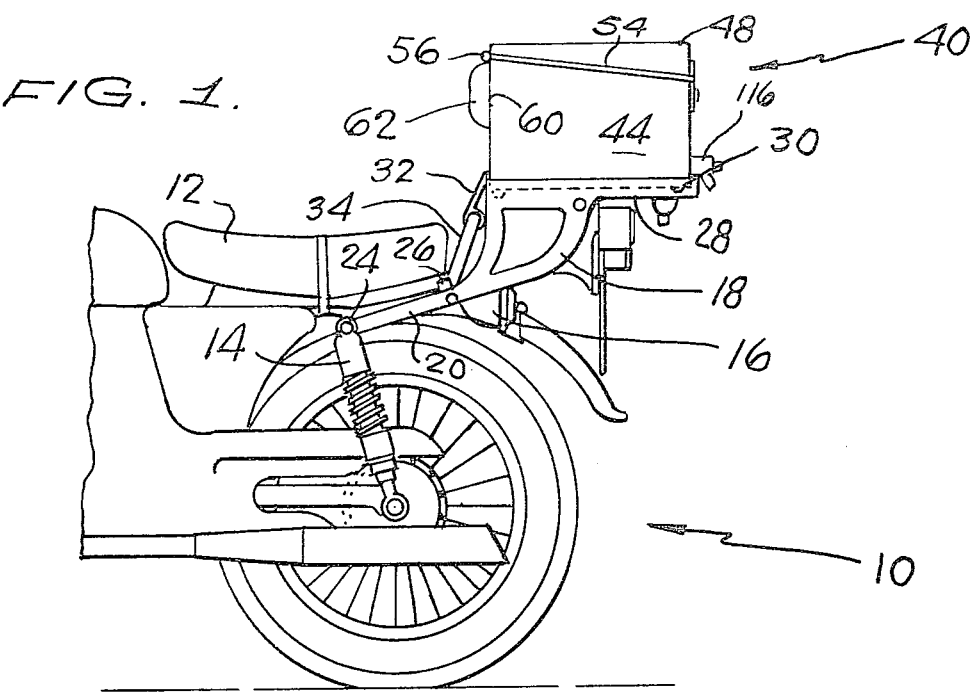
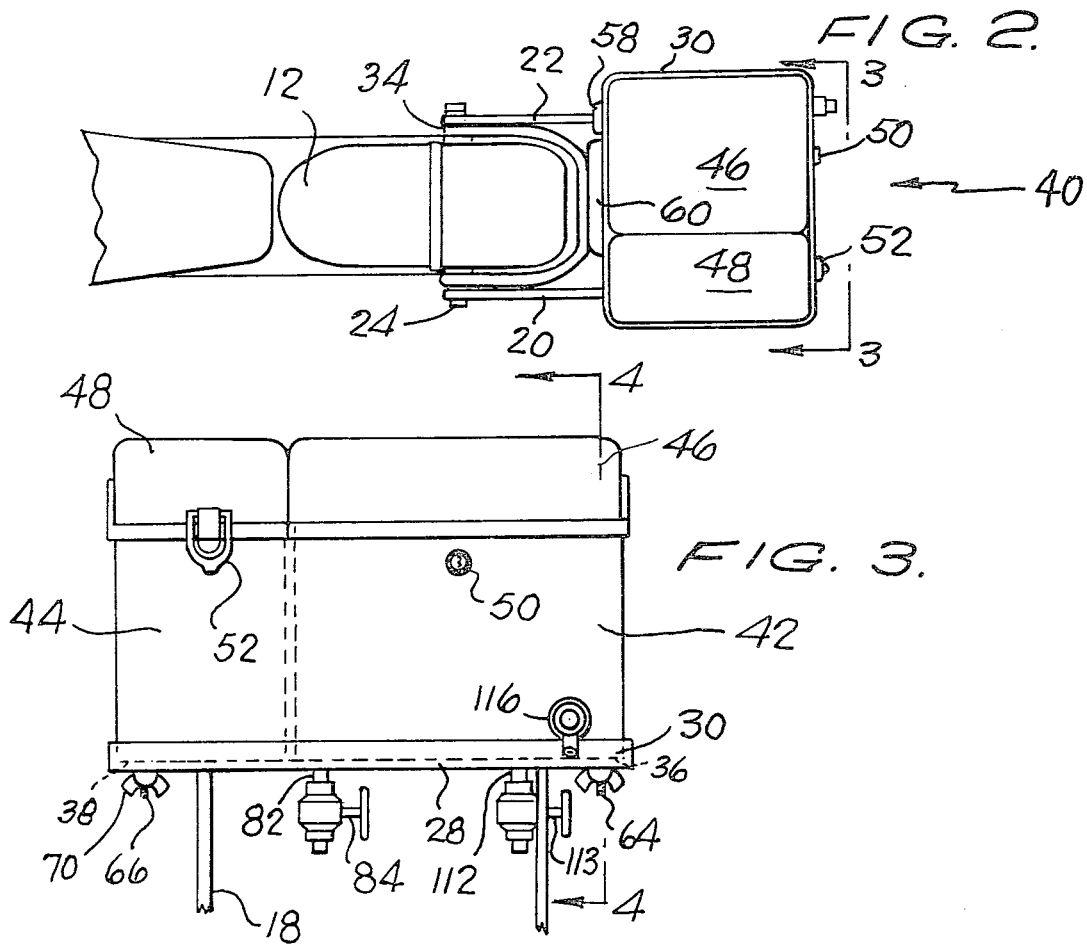

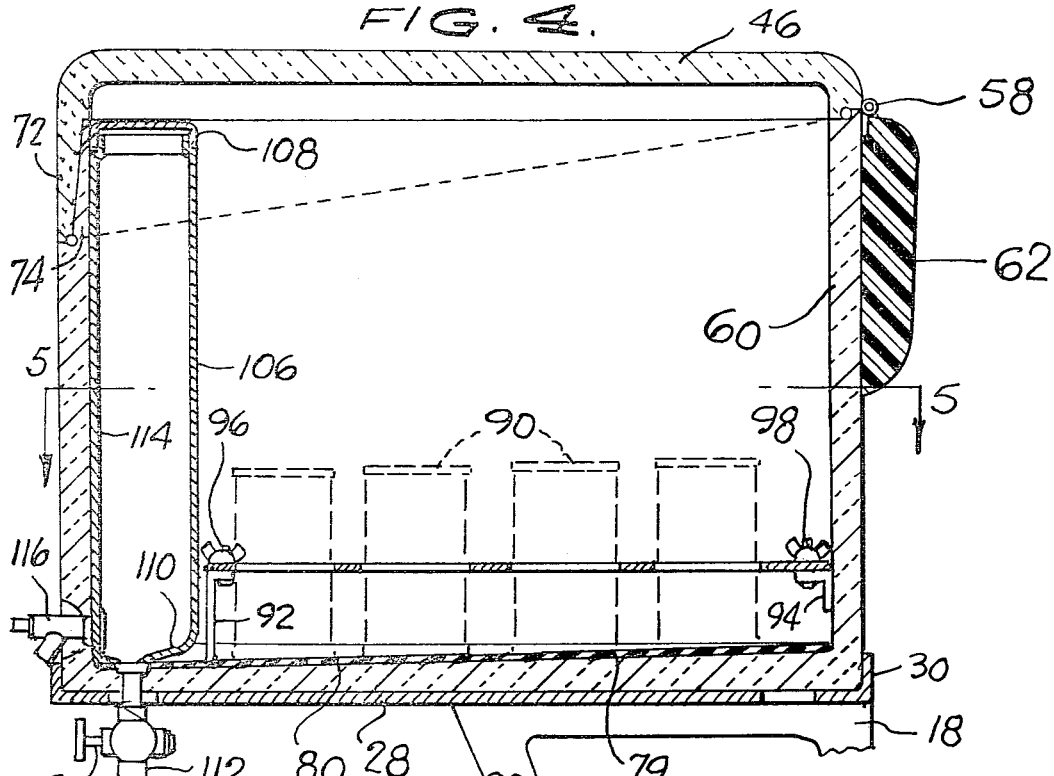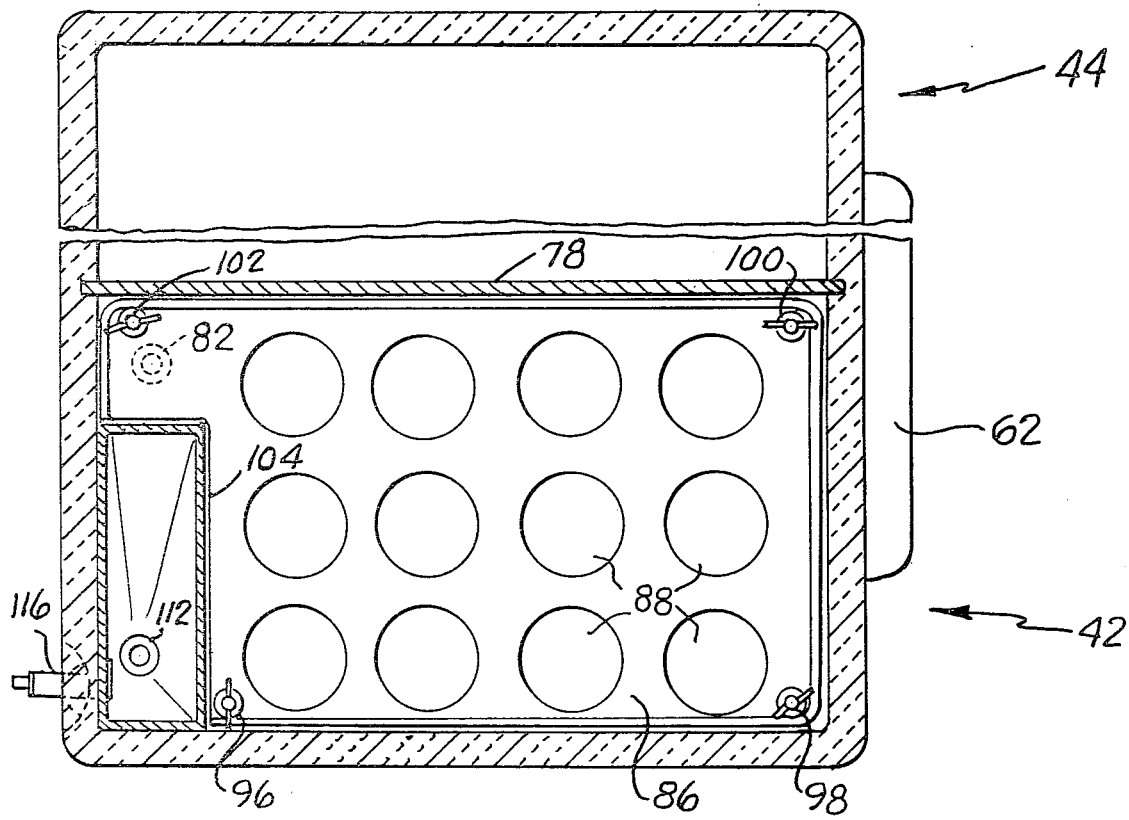

MOTORCYCLE ICE CHEST

This is a division of application Ser. No. 822,240, filed Aug. 5, 1977, now U.S. Pat. No. 4,195,757.

BACKGROUND OF THE INVENTION

1. Field of the Invention

The present invention relates to motorcycle accessories and, more particularly, is directed towards an ice chest and container adapted to be mounted on the rear portion of a motorcycle.

2. Description of the Prior Art

Many different accessories are presently marketed for motorcycles. However, I am not aware of any which are directed towards food and/or beverage carriers which are suitably designed so as to be easily mounted on the rear of a motorcycle.

Since a motorcycle has virtually no storage space, such a food and/or beverage container must be rugged, inexpensive, easily mounted and dismounted, and versatile. It should, for example, enable different beverages to be stored at cold temperatures for an extended period of time, and should also enable food and other dry goods to be kept below ambient temperature for reasonable lengths of time.

The ice chest art is well-developed, as exemplified by the following U.S. Pat. Nos. of which I am aware: 2,858,957; 3,586,201; 3,613,872; 3,791,547; 3,945,496; and 3,980,216. However, none of the foregoing constructions are amenable to mounting on a motorcycle, nor take into account the particular rough conditions to which such an ice chest would be subjected.

OBJECTS AND SUMMARY OF THE INVENTION

It is therefore a primary object of the present invention to provide an ice chest or container which is particularly adapted to be mounted upon the rear of a motorcycle so as to be easily transported therewith and removable therefrom.

Another object of the present invention is to provide a rugged, inexpensive, easily constructed and useful ice chest for a motorcycle which has both an ice compartment as well as a dry compartment.

The foregoing and other objects are attained in accordance with one aspect of the present invention through the provision of apparatus for use with a motorcycle having a rearwardly mounted carrier rack, which comprises container means for fastening to the carrier rack and including a cushioned back rest on an outer wall thereof and separated ice and dry compartments. The wet compartment includes means for containing fresh water and means for supporting a plurality of beverage containers. More particularly, the means for supporting a plurality of beverage containers comprises a substantially planar tray having a plurality of apertures formed therein for receivably retaining the beverage containers therein. The tray is preferably secured to support means formed on the inner wall of the ice compartment and includes means for selectively securing the corners of the tray to the support means.

In accordance with other aspects of the present invention, the wet compartment preferably includes a drain hole positioned through the bottom wall thereof, the latter being inclined towards said drain hole so as to facilitate drainage of the ice compartment. The drain hole includes an outlet conduit extending through the bottom wall of the ice compartment and preferably includes a shut-off valve for controlling the issuance of fluid therefrom.

In accordance with other aspects of the present invention, the means for containing fresh water comprises a separate container having a removable top and positioned in the forward portion of the ice compartment, the separate container including a selectively actuable faucet positioned through the front wall of the ice compartment. The tray has formed therein a cut out portion for accommodating the fresh water container in a corner thereof so as to rigidly secure same during travel.

In accordance with still other aspects of the present invention, the ice and dry compartments include individual manually operable lids for covering each compartment separately. Means are also provided for individually securing the lid means to the ice and dry compartments. The carrier rack preferably extends upwardly and rearwardly of the seat of the motorcycle and includes a planar horizontal surface for supporting the container means as well as an upstanding flange formed about the periphery of the planar surface for retaining the container means therewithin during transit.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a side, elevational view which illustrates a preferred embodiment of the present invention;

FIG. 2 is a top view of the preferred embodiment illustrated in FIG. 1;

FIG. 3 is an enlarged, front, plan view of the preferred embodiment illustrated in FIG. 2 and taken along line 3—3 thereof;

FIG. 4 is an enlarged, sectional view of the preferred embodiment illustrated in FIG. 3 and taken along line 4—4 thereof; and FIG. 5 is a partially broken, cross-sectional view of the preferred embodiment illustrated in FIG. 4 and taken along line 5—5 thereof.

DETAILED DESCRIPTION OF THE PREFERRED EMBODIMENT

Referring now to the drawings, wherein like reference numerals indicate identical or corresponding parts throughout the several views, and more particularly to FIG. 1 thereof, the rear portion of a motorcycle is indicated generally by reference numeral 10. This side view of motorcycle 10 reveals a standard seat 12, a shock absorber 14, and a rear turn signal lamp 16.

The present invention includes a rear rack or carrier 18 having a pair of downwardly depending, spaced support legs 20 and 22 (FIG. 2). Support legs 20 and 22 are fastened at their terminal ends to the upper bolt 24 of the shock absorber 14 and its mate (not shown). The support legs 20 and 22 are further preferably fastened to a retaining bolt 26 of the rear turn signal lamp 16.

The rear rack or carrier 18 includes a substantially planar, horizontal upper surface 28. Extending upwardly and formed about the entire periphery of the horizontal surface 28 is a flange 30 which further assists in retaining the ice chest 40 on the rack 18 both during transit and at rest. A latching strap 32 may be secured between the forward end of rack 18 and the rear bumper 34 of the motorcycle 10 for providing additional retaining support.

Formed in the four corners of the upper surface 28 of the rack 18 are bolt holes, indicated by reference numerals 36 and 38 in FIG. 3, for securing the container 40 thereto.

The container 40 of the present invention is mounted on the flat surface 28 of carrier 18 and is divided generally into two portions: a large ice compartment 42 and, positioned therenext, a somewhat smaller dry compartment 44. The ice compartment 42 includes its own individually operable lid 46, while the dry compartment 44 is provided with a second, individually operable lid or cover 48. The ice compartment 42 is preferably provided with a built-in lock 50 for securing the contents thereof against theft, while the dry compartment 44 preferably includes a quick-release latch mechanism 52 to provide easy access to the contents thereof.

As seen in FIG. 1, the lids 46 and 48 mate with the body portions 42 and 44 on the sides of the container 40 at an upwardly sloping joint 54 which terminates in a pair of rear hinges 58 and 56, respectively. This permits a padded back rest 62 to be attached to the uppermost surface of the common rear walls 60 of the compartments 42 and 44. Back rest 62 serves to support the rider of the motorcycle 10 and is preferably permanently mounted to the rear wall 60 for this purpose.

Referring back to FIG. 3, the bottom wall of the container 40 includes four downwardly depending bolts at the respective corners thereof, two of which are indicated by reference numerals 64 and 66, which respectively fit through apertures 36 and 38 in rack 18 to be secured, for example, by wing nuts 70, respectively.

Referring now more particularly to FIGS. 4 and 5, the details of the inner construction of the ice chest 40 of the present invention will now be set forth. The front portion of the tops 46 and 48 are respectively tapered as at 72 to mate with an upwardly tapered edge 74 of the front portion of the containers 42 and 44 to provide a greater seal and insulation against outside air.

A vertical, substantially planar divider 78 is positioned between the ice compartment 42 and the dry compartment 44 so as to prevent any leakage from the former to the latter, but so as to permit the cooling capacity of the former to be thermally transmitted to the latter. This permits, in turn, dry goods placed within container 44 to be maintained in a cooled condition for some period of time.

The bottom inner surface of the ice compartment 42 is preferably provided with a thin rubber sheet or liner 79 to minimize noise, vibration and/or breakage, and is also sloped downwardly and forwardly as at 80 to provide proper drainage to a drain pipe 82 formed through the bottom wall thereof at the forward and centermost portion of the ice compartment 42 (see FIGS. 3 and 5). The placement of the drain pipe 82 forwardly is to take advantage of the forwardly sloping wall 80, while its placement as indicated in FIG. 3 is to take advantage of the normal rest position of the motorcycle which would tilt any ice water towards the corner wherein the drain pipe 82 is positioned. The drain pipe 82 is preferably provided with a cut-off valve 84 for regulating the flow of melted ice water therethrough such that it may be adjusted to drain the container 42 at any time and at any rate.

Positioned at the lower portion of the ice compartment 42 and extending substantially about the entire periphery thereof is a substantially planar, horizontally disposed tray 86 which has formed therein a plurality of openings 88. Openings 88 are sized so as to hold standard beverage containers therein, such as cans 90 indicated in dotted outline in FIG. 4, for example. FIG. 4 illustrates a pair of support members 92 and 94 which respectively extend from the bottom and side walls of ice compartment 42 and through which nut and bolt assemblies 96 and 98 are secured. As seen in FIG. 5, additional nut and bolt assemblies 100 and 102 are provided at the other corners of tray 86. The entire construction securely maintains the tray in position and therefore is particularly adapted for over-the-road travel.

As illustrated in FIG. 5, an L-shaped recess 104 is formed in one corner of tray 86 so as to accommodate a substantially vertical, elongated fresh water container 106 which may be separately or integrally formed within ice compartment 42. Container 106 preferably includes a top 108 which is easily removable for cleaning. The bottom 110 of container 106 is preferably sloped forwardly to facilitate drainage thereof through a drain plug 112 having a cut-off valve 113. Further, the forward wall 114 of container 106 includes a spigot or faucet 116 which may be manually actuated to deliver the water content of container 106 as desired.

Obviously, numerous modifications and variations of the present invention are possible in light of the above teachings. It is therefore to be understood that within the scope of the appended claims, the invention may be practiced otherwise than as specifically described herein.

I claim as my invention:

1. For use with a motorcycle having a rearwardly mounted carrier rack, apparatus which comprises container means for fastening to said carrier rack and including a cushioned back rest on an outer wall thereof, an ice compartment, a dry compartment adjacent said ice compartment, non-insulative waterproof divider means separating said dry compartment from said ice compartment for maintaining articles placed in said dry compartment at a lowered temperature, said ice compartment including separate container means for containing fresh water and apertured tray means for supporting a plurality of beverage containers, said apertured tray means including a cut out portion for positioning said separate container means therein.

2. The apparatus as set forth in claim 1, wherein said apertured tray means for supporting a plurality of beverage containers comprises a substantially planar tray having a plurality of apertures formed therein for receivably retaining said beverage containers therein.

3. The apparatus as set forth in claim 2, wherein said ice compartment includes support means and also includes means for selectively securing the corners of said tray to said support means.

4. The apparatus as set forth in claim 1, wherein said ice compartment includes a drain hole positioned through the bottom wall thereof, said bottom wall being inclined towards said drain hole.

5. The apparatus as set forth in claim 4, wherein said drain hole includes an outlet conduit having a shut-off valve for controlling the issuance of fluid therefrom.

6. The apparatus as set forth in claim 1, wherein said means for containing fresh water comprises a separate container having a removable top and positioned in the forward portion of said ice compartment, said separate container including a selectively actuable faucet positioned through the front wall of said ice compartment.

7. The apparatus as set forth in claim 1, wherein said ice and dry compartments include individual manually operable lid means for covering same, respectively.

8. The apparatus as set forth in claim 7, further comprising means for individually securing said lid means to said ice and dry compartments, respectively.

9. For use with a motorcycle having a rearwardly mounted carrier rack, apparatus which comprises container means for fastening to said carrier rack and including a cushioned back rest on an outer wall thereof, and separated ice and dry compartments, said ice compartment including integral additional container means for containing fresh water and means for supporting a plurality of beverage containers, and rubber liner means positioned on the bottom floor of said ice compartment for minimizing noise and vibration, wherein said carrier rack extends upwardly and rearwardly of the seat of said motorcycle and includes a planar surface for supporting said container means and an upstanding flange formed about the periphery of said planar surface for retaining said container means therewith.

10. The apparatus as set forth in claim 1, further comprising rubber liner means positioned on the bottom floor of said ice compartment for minimizing noise and vibration.

* * * * *